US006032492A

United States Patent [19]

Kammonen

[11] Patent Number: 6,032,492

[45] Date of Patent: Mar. 7, 2000

[54] I.S. MACHINE

[75] Inventor: Jarmo Kammonen, Indal, Sweden

[73] Assignee: Emhart Glass S.A., Cham, Switzerland

[21] Appl. No.: 09/204,828

[22] Filed: Dec. 3, 1998

[51] Int. Cl.[7] .......... C03B 7/16

[52] U.S. Cl. .......... 65/222; 65/225; 65/304; 425/256; 425/257

[58] Field of Search .......... 65/222, 225, 304; 193/2 A, 14; 425/256, 257, 258

[56] References Cited

U.S. PATENT DOCUMENTS

| | | | |
|---|---|---|---|
| 4,566,894 | 1/1986 | Kulig et al. | 65/304 |
| 5,213,602 | 5/1993 | Foster et al. | 65/304 |
| 5,254,150 | 10/1993 | Riemer et al. | 65/225 |
| 5,298,049 | 3/1994 | Meyer | 65/225 |
| 5,549,727 | 8/1996 | Meyer | 65/227 |
| 5,599,370 | 2/1997 | Struckmeier et al. | 65/207 |
| 5,888,267 | 7/1997 | Schumann et al. | 65/207 |

*Primary Examiner*—Sean Vincent
*Attorney, Agent, or Firm*—Spencer T. Smith

[57] ABSTRACT

An I.S. glass forming machine is disclosed which has a plurality of individual sections each having a parison mold including a cavity having a first vertical axis. There is a trough assembly for each of the mold cavities which includes a deflector defining a second vertical axis. A horizontal beam supported by vertical uprights extends over the individual sections. The horizontal beam has a plurality of vertical openings corresponding to the number of individual sections of the machine which are in substantial alignment with the vertical axis of corresponding parison mold cavities. A corresponding plurality of hangers each defining a third vertical axis. The hangers are secured within the vertical openings with the third vertical axis coincident with the first vertical axis of a corresponding parison mold cavity and the trough assemblies are supported on a corresponding hanger with the third vertical axis of the hanger coincident with the second vertical axis of the supported deflector.

4 Claims, 2 Drawing Sheets

II
II
22
23
27
20
41
30
32
34
36
38
40
24
44
16
12
28
26
A
11
18
20
14
10

78
70
72
32,30
42
18
40
92
46
50
48
84
52
48
54
64
56
38
34
36
44
68
66
60
62
58
A 80
78
76

82
94
70
74
IV
96
IV
100
98
86
100
88
90
94
A 96
98
82
74
70
94

I.S. MACHINE

The present invention relates to machinery for manufacturing glass containers, such as an I.S. (individual section) machine, and specifically to the overhead structure which supports the trough assembly portion of the delivery equipment that is used for delivering gobs of glass to the parison molds of each section.

BACKGROUND OF THE INVENTION

An I.S. machine has a number of identical sections, each of which has a blank station at which a number of gobs of molten glass (one, two, three four, . . . ) are formed into parisons and a blow station at which the parisons are blown into bottles. Each gob of molten glass is received by an individual mold at the blank station and a set of delivery equipment consisting of a scoop, trough, and deflector is associated with each mold for loading a molten gob, from the feeder into the blank or parison mold. The ideal design is to have this equipment form a straight line in the vertical plane from the centerline of the feeder orifice to the centerline of the parison mold cavity. This is to keep the time required for gob loading as consistent as possible for each cycle and to ensure that the gob arrives at the parison mold in its desired condition. The gob distributor which supports a scoop for each gob, determines the alignment and orientation of the scoop.

This invention relates to the support and alignment of the trough and deflector that together will be called the trough assembly.

The prior art trough assembly deviated from this ideal line at the joint between the trough and the deflector. Each trough assembly consisted of a stationary upwardly facing inclined trough which received the gob from the scoop and an adjustable downwardly facing deflector which deflected the gob The prior art trough assembly deviated from this ideal line at the joint between the trough and the deflector. Each trough assembly consisted of a stationary upwardly facing inclined trough which received the gob from the scoop and an adjustable downwardly facing deflector which deflected the gob which had traveled down the trough into a vertical path to fall into the parison mold cavity. The deflector and trough support was mounted to the side of the machine beam, which extended over all the sections, using brackets so as to maintain a pivot point at the joint between the stationary trough and the adjustable deflector. This would keep the upper end of the deflector in point alignment with the lower end of the trough. The lower end of the deflector has a transverse lug with a vertical bore. This bore fits over a pin that is adjustable about x and y axes to enable adjustment of the position of the lower end portion of the deflector in relation to the associated parison cavity. This method of adjustment allows the lower end of the deflector to move out of line with the trough and causes the upper end of the deflector to pivot and create a "dog leg" at the joint between the trough and the deflector.

In U.S. Pat. No. 5,549,727 there is disclosed a trough assembly for the delivery of a gob of molten glass from a gob distributor to a parison mold cavity in a glassware forming machine comprising an upwardly facing inclined trough which is arranged to receive a gob from a scoop of the gob distributor and a downwardly facing deflector in which the deflector and trough are mounted on a hanger which is supported by a frame member of the machine by a flexible member. In this assembly, adjustment of the position of the deflector may be made without causing misalignment of the deflector and the trough. This flexible suspension trough assembly is designed to be supported by brackets attached to machined pads on the side of the main machine beam. This method is used so as to allow replacement of the existing brackets, used for the prior state of the art trough assembly, so existing machines could be upgraded to the new system. For new machines, this method is expensive to manufacture.

OBJECT OF THE INVENTION

It is accordingly an object of this invention to provide a more economical construction of supporting the flexible suspension trough assembly.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
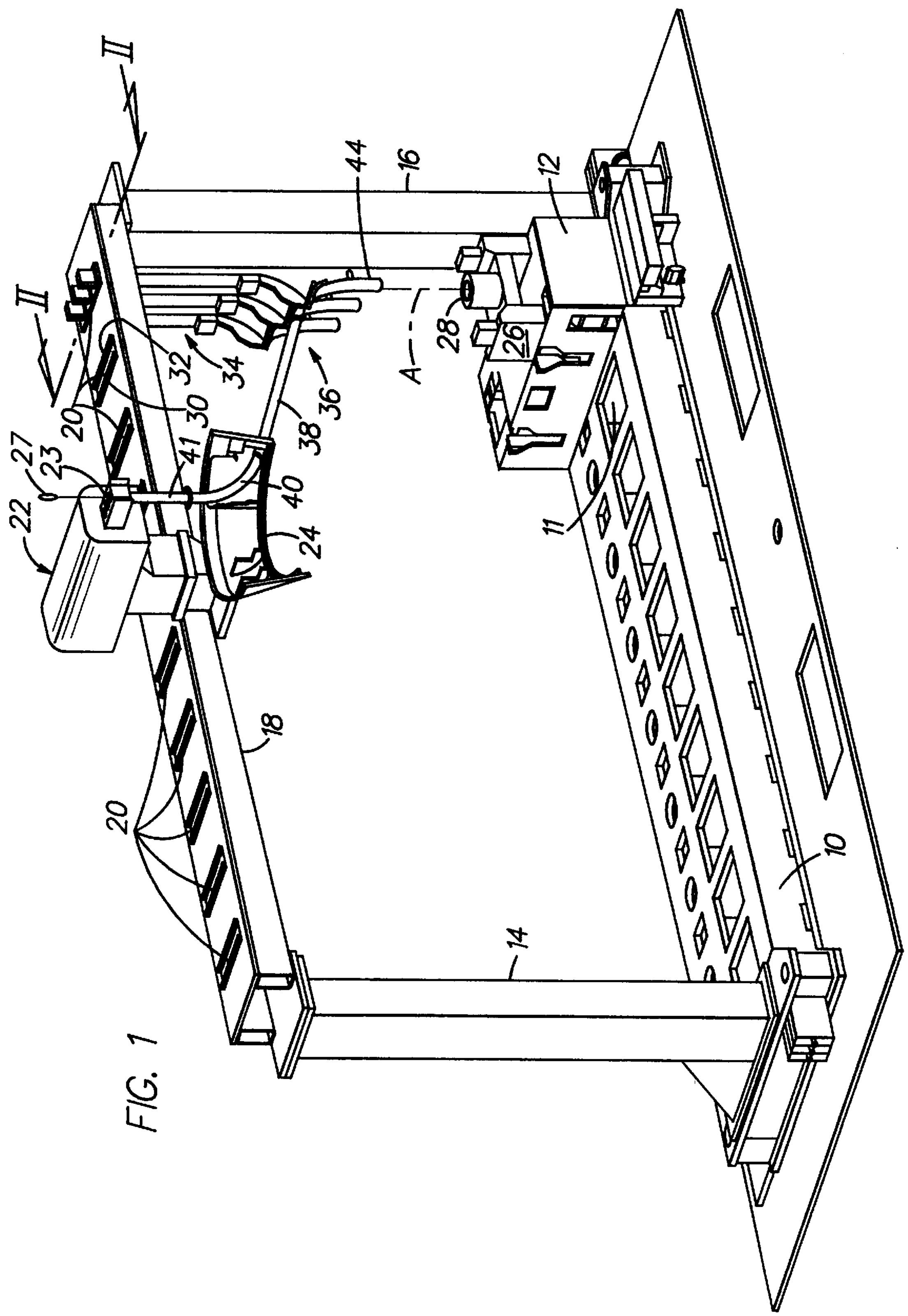
FIG. 1 is an oblique view of a portion of a 10 section I.S. machine made in accordance with the teachings of the present invention.

FIG. 1 discloses a machine bed 10 for an I.S. machine (here a ten section machine) which has a corresponding number of access openings 11 in its top surface. Fixed to its top surface, over these openings are a corresponding number of individual section frames 12. A first vertical upright 14 is fixed to the top surface of the machine bed at one end and a second vertical upright 16 is fixed to the top surface of the machine bed at the other end locating the individual section frames therebetween. Mounted across the top surface of the vertical uprights 14, 16 is a horizontal beam 18 which has a corresponding number of vertical openings 20. Also mounted to the horizontal beam are a gob distributor 22 which has a number of openings 23 corresponding to the number of gobs to be processed in each section (here the machine is a triple gob machine) and an upper trough support 24.

Each individual section 12 has a parison or blank mold supporting mechanism 26 having a parison mold 28 for each gob to be processed by the section (here only one of sections is shown and only one of the three molds is shown for purpose of clarity).

Figure 2:
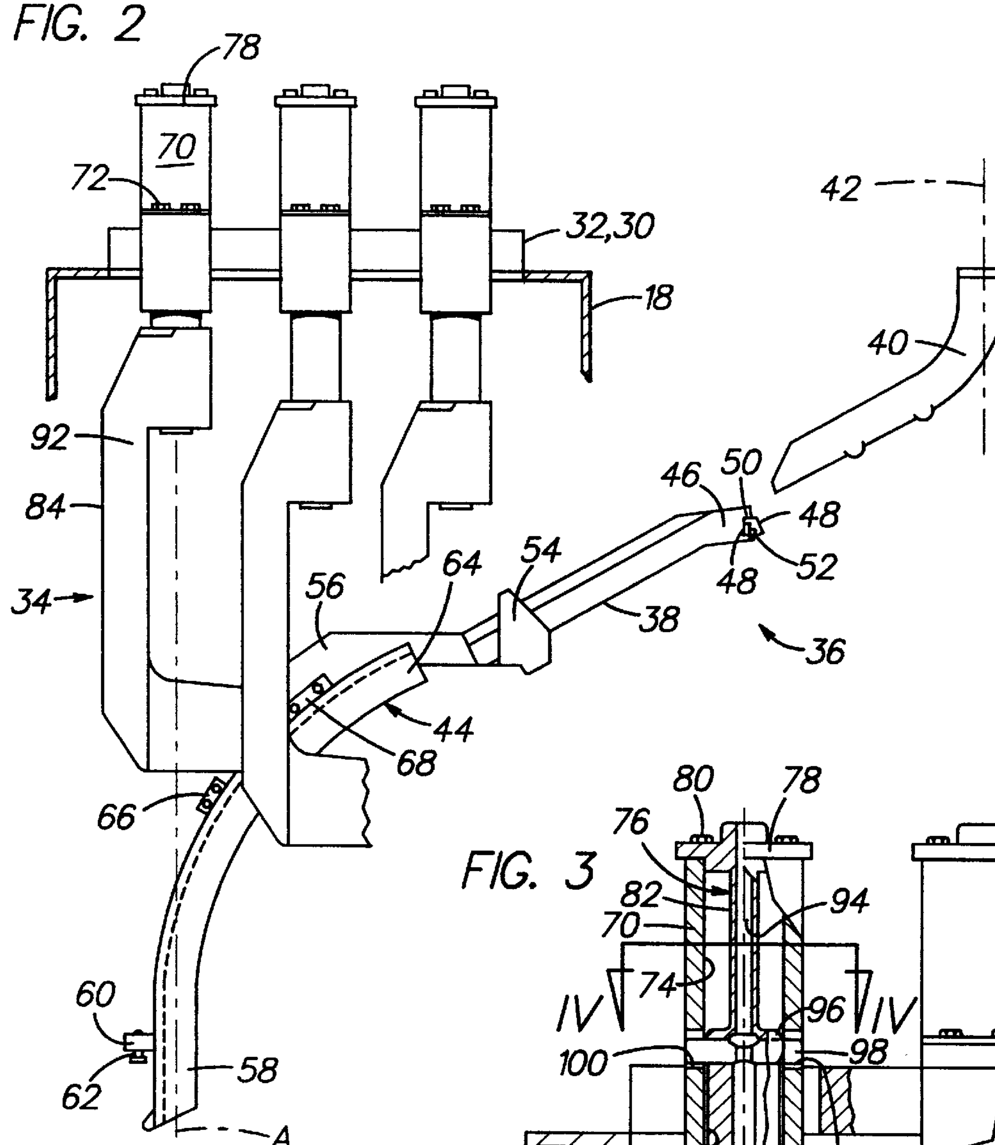
FIG. 2 is a view of a trough assembly secured to the overhead structure taken along II—II of FIG. 1.
Figure 3:
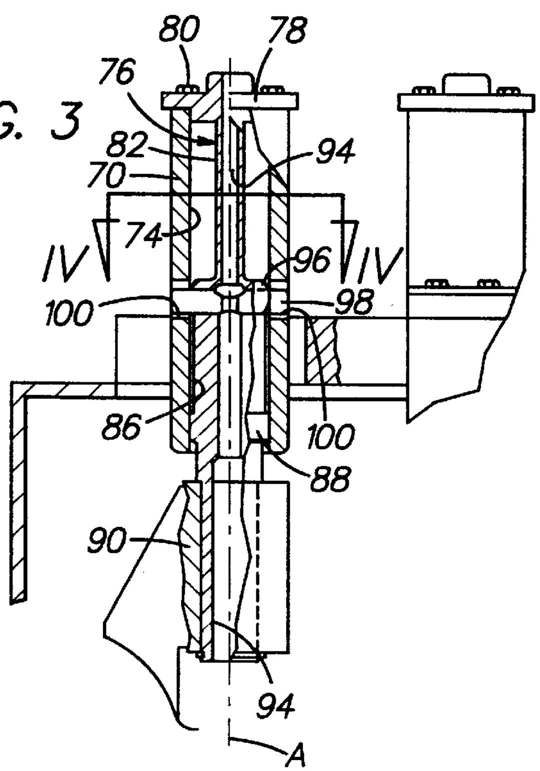
FIG. 3 shows a portion of the trough assembly shown in FIG. 2, partly broken away and in section.
Figure 4:
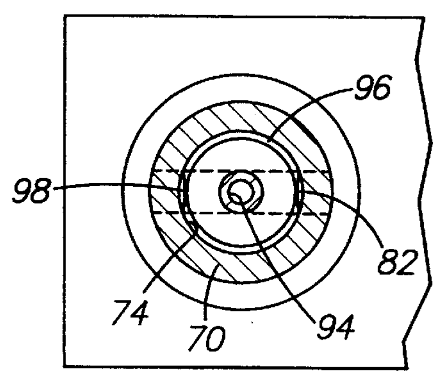
FIG. 4 shows a view in cross section taken along IV—IV of FIG. 3.

Each mold has a cavity having a vertical axis A capable of receiving a molten gob 27 from a location above the beam. Each rectangular opening 20 in the beam is located substantially over the vertical axis or axes of the parison mold cavity(ies) of the individual section that it is associated with. Each rectangular opening 20 has two spaced pads 30, 32, which are part of the horizontal beam 18, for mounting individual hangers 34. One hanger 34 is required for each trough assembly 36. FIGS. 1, 2, and 3 show three hangers for each section to suit a triple gob machine but this can vary to suit a different number of gobs.

Each trough assembly 36 (FIG. 2) comprises an upwardly facing inclined trough 38 to receive a gob 27 from a scoop 40 of the gob distributor which receives the gob from a receiving sleeve 41 of the gob distributor. The scoop 40 can be rotated about a vertical axis 42 to align with each trough assembly 36. The trough assembly has a downwardly facing deflector 44 defining a vertical axis which deflects a gob which has traveled down the trough 38 into a vertical path which may be aligned along axis A of the parison mold cavity.

The trough 38 has an upper end portion 46 that comprises two spaced downwardly extending lugs 48, each having a slot 50. Fixed to the upper trough support 24 is a rod 52 that extends across the forming machine in a curve around the gob distributor and has secured to it a clamp block (not shown). The trough 38 hangs on the rod 52 with the rod 52 in the slots 50 and the lugs 48 on opposite sides of the clamp block. The trough 38 is thus free to move angularly about the rod 52 and is capable of limited angular movement with respect to the clamp block about a vertical axis as there is a certain amount of play between the clamp block and the lugs 48.

The upper end portion 46 of the trough is thus held in alignment with the scoop 40 when the scoop is in its appropriate position. A lower end portion of the trough is mounted in a bracket 54 that is secured to a support member 56 of a hanger 34. The deflector 44 has a lower end portion 58 that has a lug 60 with a vertical hole in it. This lug 60 is fitted over a pin 62 that is secured in the machine and is capable of limited adjustment in a horizontal plane so that the precise position of the lower end portion 58 can be adjusted. An upper end portion 64 of the deflector 44 is also secured to the support member 56 by two brackets 66, 68.

It can be seen that by appropriate adjustment of the pin 62, the lower end portion 58 of the deflector 44 can be correctly positioned over the parison mold of the section. The deflector 44 and the trough 38 are aligned with each other and secured in position by the brackets 54, 66, and 68.

The hanger 34 comprises a supporting member 70 which is secured to the two spaced pads 30, 32 of the horizontal beam 18 by four bolts 72 through opposed side flanges of the member 70. The hanger 34 (FIG. 3) has a vertical cylindrical bore 74 which has a vertical axis which is aligned with axis A of the parison mold cavity. A first flexible hanger member 76 comprises at its upper end portion a disc 78 which is secured to the supporting member 70 by bolts 80 and a flexible tubular portion 82 which extends axially in the bore 74. A second rigid hanger member 84 is secured to the lower end portion of the flexible member 76. In the embodiment shown, the flexible member 76 is in fact integral with an upper cylindrical end portion 86 of the rigid hanger member 84. The cylindrical portion 86 is positioned in the bore 74 of the supporting member 70 and comprises a machined collar 88. A small clearance is provided between the collar 88 and the bore 74 while a larger clearance is provided between the remainder of the cylindrical portion 86 and the bore 74.

The hanger 34 further comprises a cylindrical boss 90 which is welded to the cylindrical portion 86 and an arm portion 92 which at its upper end is clamped to the boss 90 and at its lower end provides the supporting member 56 which supports the deflector 44 and the trough 38.

A through passage 94 is provided through the first flexible hanger member 76, the cylindrical portion 86, and the boss 90. The supporting member 56 is somewhat cranked in a horizontal plane so that the through passage 94 may be used with an optical or physical plumb line to align the axis of the supporting member 70 with a parison mold cavity.

The arrangement is such that, in each section, each mold cavity and the deflector associated with it is associated with a separate hanger—that is to say the spacing between the supporting members 70 corresponds to the spacing of the parison mold cavities.

It can also be seen that the arrangement is such that the vertical axes of the supporting member 70 and of the deflector 44 are normally in alignment and can be aligned with a mold cavity by adjustment of the supporting member on the spaced pads 30,32 of the beam 18. However, occasion may arise (for example upon changing of gob size) when it is desired to adjust the position of the deflector by a small amount and the supporting member 56 can be moved in any direction from its aligned position to a small extent in any direction. On such movement of adjustment being effected, the tubular portion 82 bends between the points at which it is fixed to the supporting member 70 and the cylindrical end portion 86 of the rigid hanger member 84. This cylindrical end portion 86 has a spherically rounded upper end portion 96 which allows the portion 86 to pivot essentially about the center of the spherical portion 96. A pin 98 secured in the upper end portion 96 extends through two opposed holes 100 in the supporting member 70 and prevents any torsional movement of the rigid member 84.

I claim:

1. An I.S. glass forming machine comprising a plurality of individual sections each having a parison mold including a cavity having a first vertical axis, a trough assembly for each of said mold cavities including a deflector including a lower portion with a second vertical axis, a horizontal beam, vertical upright means for supporting said horizontal beam over the parison mold cavities of said plurality of individual sections, means for mounting said trough assemblies so that said second vertical axis of each of said deflectors will be coincident with the first vertical axis of a corresponding one of the parison mold cavities including said horizontal beam having a vertical opening for each of said parison mold cavities, said vertical openings being in substantial alignment with the vertical axis of corresponding parison mold cavities, a corresponding plurality of hangers each defining a third vertical axis, and means for securing one of said hangers within each of said vertical openings with said third vertical axis coincident with the first vertical axis of a corresponding parison mold cavity, and means for supporting each of said trough assemblies on a corresponding hanger with the third vertical axis of the hanger coincident with the second vertical axis of the supported deflector.

2. An I.S. glass forming machine according to claim 1, further comprising a gob distributor mounted on said beam.

3. An I.S. glass forming machine comprising a plurality of individual sections each having a plurality of parison molds, each of said parison molds including a cavity having a first vertical axis, a trough assembly for each of said parison mold cavities including a deflector including a lower portion with a second vertical axis, a horizontal beam, vertical upright means for supporting said horizontal beam over the parison mold cavities of said plurality of individual sections, means for mounting said trough assemblies so that said second vertical axis of each of said deflectors will be coincident with the first vertical axis of a corresponding one of the parison mold cavities including said horizontal beam having vertical opening means corresponding to the number of individual sections of the machine, each of said vertical opening means being in substantial alignment with the vertical axis of the parison mold cavities of a corresponding individual section, a hanger for each of the mold cavities, each defining a third vertical axis, and means for securing the hangers for each section within the corresponding one of said plurality of vertical opening means with said third vertical axis of each of said hangers coincident with the first vertical axis of a corresponding parison mold cavity of the corresponding section, and means for supporting each of said trough assemblies on a corresponding hanger with the third vertical axis of the hanger coincident with the second vertical axis of the supported deflector.

4. An I.S. glass forming machine according to claim 3, further comprising a gob distributor mounted on said beam.

* * * * *